United States Patent [19]

Poulsen

[11] Patent Number: 4,931,611
[45] Date of Patent: Jun. 5, 1990

[54] METHOD AND APPARATUS FOR JOINING ELECTRICAL WIRES

[76] Inventor: Peder U. Poulsen, Huntington Rd., Box 197, Stratford, Conn. 06497

[21] Appl. No.: 267,271

[22] Filed: Nov. 4, 1988

[51] Int. Cl.⁵ .............................................. B23K 9/00
[52] U.S. Cl. .............................. 219/56.22; 219/25.18
[58] Field of Search .................. 219/56.1, 56.22, 85.18

[56] References Cited

U.S. PATENT DOCUMENTS 3,390,252  6/1968  Storck ............................ 219/56.1 X
4,166,943  9/1979  Tanaka et al. .................. 219/56.1 X Primary Examiner—George H. Miller, Jr.

[57] ABSTRACT

An apparatus and method for joining electrical wires utilizing TIG, (Tungsten Inert Gas) welding, comprising mechanically operated, electrically conductive jaws which gather the wires to be joined in a tight bundle with their ends located in close proximity from the tungsten electrode and gas nozzle of a TIG welding gun, a moveable plate covering the gas nozzle and electrode defining the proper distance between the wire ends and the tungsten electrode and arranged to move away to uncover the electrode after the jaws have closed, and an electrical switch which automatically initiates the welding cycle after the other actions have been completed.

5 Claims, 2 Drawing Sheets

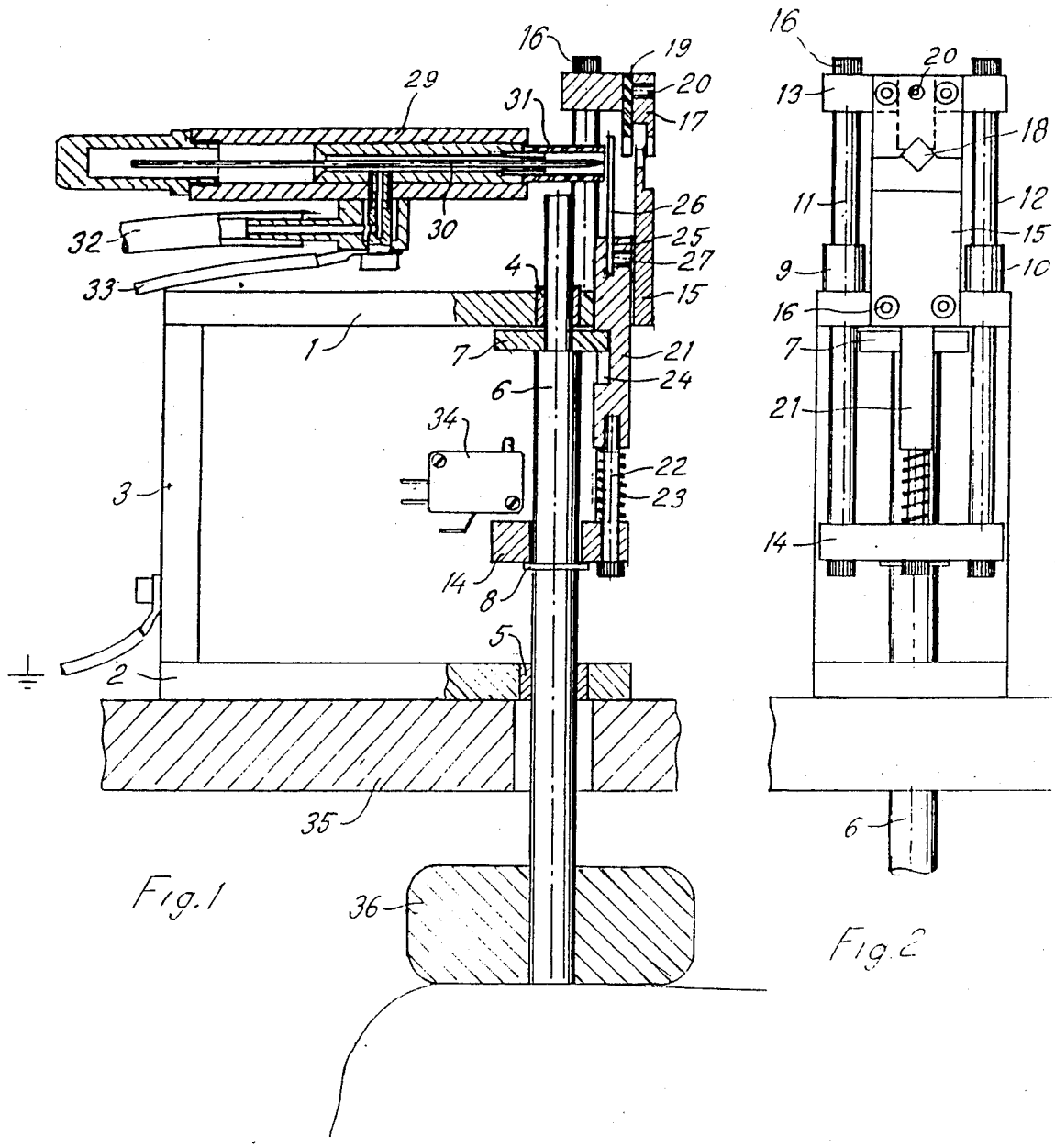

METHOD AND APPARATUS FOR JOINING ELECTRICAL WIRES

This invention relates to a method and apparatus for establishing a strong, electrically conductive connection between two or more metal wires. The wires to be joined can be solid or multi-stranded and composed of the same or a plurality of metals. A common objective of the invention is joining solid, so called magnet wire, used in electrical coils, with multi-stranded, insulated lead wire used for the termination of coils in electrical apparatus like e.g. motors and transformers.

Several methods are commonly available for termination including soldering, brazing, compression welding and resistance welding as well as mechanical application of terminal splices. The invention provides an alternative, fast, mechanized method of termination which does not involve elements foreign to the conductors like solder, brazing materials or metallic splices.

In the process according to the invention the wires to be joined are gathered in a bundle between metallic jaws with their free ends pointing in the same direction and located in close proximity from a pointed tungsten electrode without actually touching the electrode. An electric circuit is established between the holding jaws and the tungsten electrode and a high voltage, high frequency alternating current applied to start a low current discharge between the wire ends and the tungsten electrode. The high voltage discharge serves to initiate a lower voltage, high current arc between the elements and the arc maintained for a period of, typically, a fraction of a second to a couple of seconds.

The heat generated in the arc causes the wire ends to melt down, first forming individual balls of molten metal at each wire end and then, as the metal flows together into a single ball, upon solidification, a strong, electrically conductive connection is established between all the wires in the bundle. In order to prevent oxide formation and contamination of the joint, and inert gas like e.g. argon may be introduced into the area during the joining process.

The welding process utilizing a tungsten electrode, a high voltage, high frequency ignition, a high current arc and inert gas blanketing is known as TIG, (Tungsten Inert Gas) welding and is used widely in the sheet metal industry to join difficult to weld metals as e.g. aluminum and stainless steel.

According to the invention such a welding process is utilized in an apparatus, also according to the invention, to produce electrical connections between conductive wires of a plurality of metals.

It is a principal object of the invention to provide a fast and safe method of mechanically gathering the wires to be joined in a close mutual proximity while at the same time establishing an electrical contact with at least one of the wires in the bundle.

It is a further object of the invention to provide a method of aligning the ends of all the wires to be joined in the same plane, in close proximity to, but without actually touching, the tungsten electrode.

Still another object of the invention is to provide means for, immediately upon gathering the wires and establishing the correct alignment and distance to the tungsten electrode, striking the high current arc which executes the joining of the wires.

Again another object of the invention is to provide means for, simultaneously as the wires are gathered and the alignment and proper distance between the elements is established, introducing inert gas to blanket the area.

Other objects of the invention will in part be obvious and will in part appear hereafter.

The invention, accordingly, comprises the features of construction, combination of elements, and arrangements of part which will be exemplified in the constructions hereinafter set forth, and the scope of the invention will be indicated in the claims.

For a fuller understanding of the nature and objects of the invention, reference should be made to the following, detailed description taken in connection with the accompanying drawings, in which:

The Drawings

FIG. 1 is a diagrammatic side elevation view of a joining apparatus according to the invention, shown partly in cross section along its center plane. The apparatus is shown with its jaws open and ready for insertion of the wires to be joined.

FIG. 2 is a diagrammatic front elevation view of the apparatus shown in FIG. 1.

Figures 3, 4:
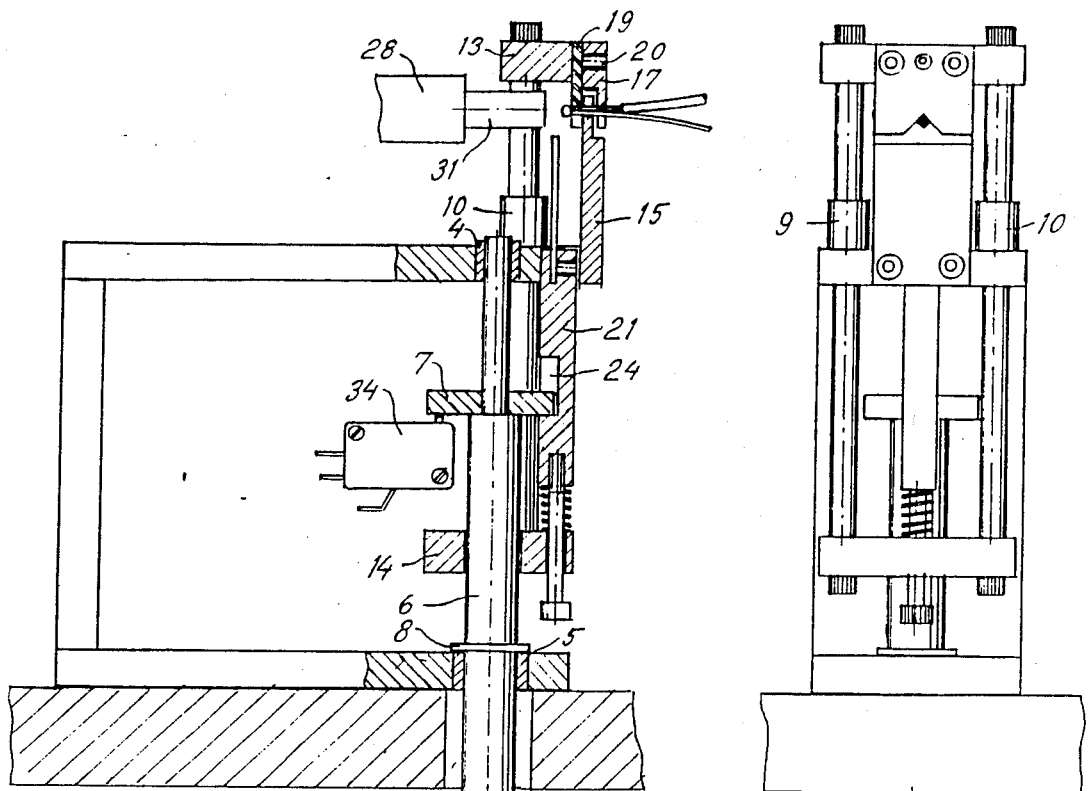
FIG. 3 is a diagrammatic side elevation view of the apparatus shown in FIGS. 1 and 2, shown partly in cross section along its center plane. The apparatus is shown with its jaws closed around the wires after the joining has taken place.
FIG. 4 is a diagrammatic front elevation view of the apparatus shown in FIGS. 1, 2 and 3. The apparatus is shown with its jaws closed around the wire bundle after joining has taken place.

The joining apparatus Shown in FIG. 1 is built around a frame having a top plate 1 and a bottom plate 2 which are mutually connected by means of plate 3 and other members not shown. Bushings 4 and 5 located in the central plane, serve as guides for a shaft 6 which is arranged so that it can slide up and down with negligible lateral play. The diameter of the top portion of shaft 6 has been reduced and a plate 7 pressed onto the reduced part to form a firm connection with the shaft. The possible vertical movement of shaft 6 is limited downwards by means of a retaining ring 8, which will hit bushing 5 when the shaft is lowered.

In the top plate 1, and positioned symmetrically on either side of the center plane, are also located bushings 9 and 10, which serve as guides for columns 11 and 12. The columns are threaded internally at both ends and serve to connect two moving plates 13 and 14 which are fastened to the upper and lower ends, respectively, of columns 11 and 12 by means of screws 16. Shaft 6 extends through a central hole in plate 14 in such fashion that the moveable assembly is raised and lowered when shaft 6 is moved up and down.

A plate 15 is fastened onto the front end of the top plate 1 by means of screws 16, and another plate 17 fastened in similar fashion to the moving plate 13. Plates 15 and 17 are machined in such fashion that the bottom portion of 17 will cover the top portion of 15 when the moving assembly is lowered as shown in FIGS. 3 and 4. A V shaped notch is machined centrally in both plates to form a diamond shaped aperture 18, the size of which changes from a maximum when the assembly is in the up position to zero when it is in the down position. Plates 15 and 17, in the following called jaws, consist of electrically conductive material like e.g. copper.

A slot, narrower than jaw 17, is machined into the front portion of plate 13 and serves to locate a plate 19, which is mounted behind jaw 17 and held in place by a set screw 20 located centrally in the top portion of the jaw. Plate 19, whose outline is indicated by dotted lines, consists of a heat resistant material like e.g. ceramic aluminum oxide, and its lower end is provided with a V shaped notch which is aligned with the similar notch in plate 17.

Another slot is machined into the front end of plate 1 and serves as guide for a slide 21, which is hidden, in part, behind plate 15. Slide 21 has a rectangular cross section, and its lower end is guided by means of a screw 22 which extends through a hole in plate 11. A coil spring 23, which surrounds the shaft of screw 22, serves to maintain distance between plate 14 and slide 21. Plate 7 interacts with a cutout 24 in the rear portion of slide 21 and dimensioned to allow some lowering of shaft 6 before the plate 7 hits the bottom of cutout 24.

A notch 25 is located near the top of slide 21 and serves as seat for a thin, elongated blade 26, fashioned from a strong material like e.g. spring steel with a width roughly equal to that of slide 21. The blade is held in place by set screw 27 and its length is such that it just covers the diamond shaped aperture 18 when the slide 21 is in its top position.

28 indicates a TIG welding gun which is fastened onto plate 1 by means not shown. The welding gun comprises a housing 29, made from insulating material, a tungsten electrode 30, a nozzle 31, made from heat resistant material like e.g. ceramic aluminum oxyde, connections for an argon hose 32 and electrical hook up 33 providing an electrical connection to electrode 30. The welding gun described is traditional and contains no invention matter.

The welding gun 28 is mounted adjustably upon plate 1 and is positioned with its gas nozzle and electrode point just behind and in close proximity to blade 26. It is aligned so that the point of the electrode 30 is just above the bottom of the V shaped notch in plate 19 and jaw 17 in the centerplane.

An electrical switch 34 is mounted in a fixed relationship with the frame in such fashion that it is engaged by plate 7 when shaft 6 is lowered just before the retaining ring 8 hits bushing 5. The switch 34 is connected to a welding power supply, not shown, to provide a welding pulse when engaged. The duration of the pulse is adjustable and may be pre-set by the operator.

The entire assembly is fitted onto a table top 35, and the lower end of shaft 6 is extended through a hole in the table top. A weight 36 is mounted onto the lower end of shaft 6 and suspended a few inches under the table top. The machine is operated by the operator lifting and lowering weight 36 by means of his or hers knee, and means are included but not shown to adjust the elements to fit the height of the operator.

The joining apparatus works as follows:

The operator lifts weight 36 to open aperture 18 as shown in FIGS. 1 and 2. The wires to be joined are inserted into the aperture all the way until they hit blade 26. Now the operator lets go, and the connection is carried out in one single action which will be described in the following:

As the knee is lowered weight 36 will follow and with it shaft 6. At first the assembly carrying the moving jaw 17 will follow, as plate 14 rests upon retaining ring 8, thus closing aperture 18. As 18 closes, the wires will be gathered in a tight bundle and electrical connection made between the jaws and the wires. The actual force gathering the wires is provided only by gravity acting upon the moving assembly, and when joining heavy and stiff wires, additional force can be provided by adding weights on top of plate 13. During this, initial, step slide 21 will follow, but as blade is still aligned with the top of aperture 18 as it closes, it still prevents, inadvertently, the operator from inserting the wires too far.

As the knee is lowered further, the assembly will stay suspended by the wire bundle wedged between the jaws, and plate 7 will hit the bottom of cutout 24 and, as the knee continues downwards, pulled slide 21 with blade 26 along down, thus uncovering the welding nozzle and electrode opposite from the ends of the gathered wires.

As the knee continues down, plate 7 will engage the switch 34 and trigger the welding pulse. As it is common in TIG welding, the pulse may comprise argon pre-flow and post-flow, but in most cases argon flow is only required while the welding is taking place. The duration of the cycle may typically be between 0.5 and 2 seconds dependent on the total cross sectional area of the wires to be joined. During this period the wire ends will melt together into a ball which melts back but is prevented from reaching the jaws 15 and 17 by means of the ceramic plate 19.

After the completion of the welding pulse, weight 36 is again lifted, and the joined wire bundle can be removed, whereafter the apparatus is ready for insertion of a new bundle of wires for joining.

Because the circuit providing the ignition voltage and welding current and regulates the argon flow is not part of the invention, it is not shown on the drawings, and many variations hereof are possible without affecting the scope of the invention.

Also the subject matter represented by the drawings and specification is only one version of an apparatus according to and defined by the invention. Since many changes may be made in the above construction without departing from the scope of the invention, it is intended that all matter contained in the above description or shown in the accompanying drawings shall be interpreted as illustrative and not in a limiting sense.

It is also understood that the following claims are intended to cover all of the generic and specific features of the invention herein described, and all statements of the scope of the invention which, as a matter of language, might be said to fall therebetween.

What is claimed is:

1. A method and apparatus for joining two or more electrical wires utilizing a TIG, (Tungsten Inert Gas) welding process, wherein the wires are gathered into a tight bundle by means of moveable, mechanically operated, electrically conductive jaws, with their ends pointing in the same direction and positioned opposite to and in close proximity from the tungsten electrode and gas nozzle of a TIG welding gun, and an arc struck between the electrode and wire ends, the arc being maintained for a period sufficient to form a ball of molten metal which, upon solidification, establishes a strong electrical connection between the wires in the bundle.

2. A method and apparatus according to claim 1, wherein a blade is mechanically positioned between the tungsten electrode and the jaws and operated in conjunction with the closing of the jaws to be pulled away from the welding zone after the jaws have closed around the wires, but before the welding arc is struck.

3. An apparatus according to claim 1, wherein a plate of heat resistant material is mounted between the rearmost jaw and the tungsten electrode.

4. An apparatus according to claims 1 or 2 or 3, wherein a moveable jaw 17 provided with a heat resistant plate 19, operates against a fixed jaw 15, behind which is located a moveable blade 26, the moveable jaw 17 being part of a sliding assembly consisting of plate 13, columns 11 and 12 and plate 14, and a sliding shaft 6 with a plate 7 and a weight 36, and a switch 34, the shaft 6 being arranged in such fashion that, when lowered, it first lowers jaw 17 to close against jaw 15, then moves blade 26 away from the welding zone and finally initiates the welding cycle via switch 34.

5. An apparatus as defined in claim 4, and mounted upon a table top 35 with shaft 6 extending downwards to be operated by knee action via the weight 36 located underneath the table.

* * * * *